(12) United States Patent
Featherston et al.

(10) Patent No.: US 7,280,547 B2
(45) Date of Patent: Oct. 9, 2007

(54) DYNAMIC WAN PORT DETECTION

(75) Inventors: Lord Nigel Featherston, Redmond, WA (US); Dennis M. Lee, Bellevue, WA (US); Thomas W. Getzinger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 10/320,859

(22) Filed: Dec. 16, 2002

(65) Prior Publication Data

US 2004/0114610 A1    Jun. 17, 2004

(51) Int. Cl.
*H04L 12/56* (2006.01)
*H04L 12/66* (2006.01)

(52) U.S. Cl. ..................... 370/401; 370/463
(58) Field of Classification Search ............. None
See application file for complete search history.

(56) References Cited

U.S. PATENT DOCUMENTS

| | | | |
|---|---|---|---|
| 6,240,472 B1 | 5/2001 | Hu | 710/72 |
| 6,449,251 B1* | 9/2002 | Awadallah et al. | 370/229 |
| 6,463,078 B1 | 10/2002 | Engstrom et al. | 370/466 |
| 6,584,096 B1* | 6/2003 | Allan | 370/352 |
| 6,717,913 B1* | 4/2004 | Ghahremani et al. | 370/230 |
| 7,031,324 B1* | 4/2006 | Goody | 370/401 |

OTHER PUBLICATIONS

Iyer, Prakash and Ulhas Warrier. Nov. 12, 2001. "InternetGatewayDevice: 1 Device Template Version 1.01." 10pp.

Steinfeld, Edward F. Sep. 13, 2001. "Devices that play together, work together." 6pp. Available at http://www.e-insite.net/endmag/index.asp?layout=article&articleID=CA154802.

Microsoft Corporation. Jun. 8, 2000. "Universal Plug and Play Device Architecture." 1-12/46pp. Available http://www.upnp.org/download/UPnPDA10_20000613.htm.

Linkup International Ltd. "Linkup "Intelligent Data Switch" Networks Any-Port to Any-Port." n.d. 5pp. Available http://www.linkupint.co.uk/html/idswitch.htm., Nov. 5, 2002.

Mapletree Networks, Inc. "UniPorte Architecture Facilitates Convergence of IP-Based Voice, Fax and Data Services." n.d. 6pp. Available http://www.mapletree.com/documents/uadatasheet.pdf., Nov. 15, 2002.

Mapletree Networks, Inc. "UniPorte Architecture." n.d. 2pp. Available http://www.mapletree.com/., Nov. 15, 2002.

* cited by examiner

*Primary Examiner*—Chi Pham
*Assistant Examiner*—Soon D. Hyun (57) ABSTRACT

A method and system for automatically detecting a wide area network (WAN) communication connection to a selected one of a plurality of substantially equivalent communication ports. An initiation event, such as a link detect or a power on event, is detected for the selected port. An attempt is then made to access the WAN through the selected port. For example, an Internet connection request may be sent through the selected port. If a response is received through the selected port, the response is evaluated to determine if the attempt to access the WAN was successful. If the attempt was successful, the selected port is set as the WAN communication connection. Otherwise, the selected port is set as a local area network communication connection. Preferably, the dynamic WAN port detection is performed by a network device, such as a gateway, or by a computer in communication with a network device.

19 Claims, 4 Drawing Sheets

DYNAMIC WAN PORT DETECTION

FIELD OF THE INVENTION

The present invention generally relates to a method and system for automatically detecting the type of network connected to a communication device, and more specifically, pertains to automatically detecting one of a communication connection to a wide area network (WAN) and a local area network (LAN) on a communication device that is capable of connecting to both a WAN and a LAN through a plurality of substantially equivalent ports available on the communication device.

BACKGROUND OF THE INVENTION

A number of communication devices enable multiple computing devices to communicate between different types of networks. Examples of such devices include gateways, routers, switches, bridges, hubs, firewalls, and the like. The computing devices may use a communication device to communicate between different types of LANs, such as between an Ethernet network and a Token Ring network. Alternatively, or additionally, the computing devices may use a communication device to communicate between an internal LAN and a WAN, such as between an Ethernet LAN and the Internet. Many communication devices can also auto-sense an operating speed on each of multiple ports, so that the device automatically communicates at 10 megabits per second (MBPS), 100 MBPS, or 1000 MBPS based upon the speed of the network to which a port is connected. Similarly, many communication devices can auto-negotiate between half and full duplex on a port. However, both the speed auto-sense and the duplex auto-sense assume predefined protocol capabilities for the communication line coupled to the port. For example, speed auto-sense involves determining the highest speed of a node that a port is connected to and adjusting the port transmission rate accordingly. Thus, the speed auto-sense is actually a predefined request/response interaction whereby each end of the communication line recognizes a request for maximum speed capability and provides a response according to the Ethernet protocol to the other end of the line.

In a similar fashion, some modems can auto-sense which protocol to use on a WAN connection over a telephone line, such as a V.90 protocol or a K56 Flex protocol. However, modems typically use a designated port or interface for connecting to a universal serial bus (USB) port or an RS-232 serial port on a single computing device. Alternatively, a modem can be connected to a gateway, which enables multiple computing devices to share the WAN connection made through the modem. Sharing a high speed WAN connection through a digital subscriber line (xDSL) interface or through a cable modem is increasingly popular for home networks and small business networks. Unfortunately, configuring a gateway or other communication device to share a WAN connection between multiple computing devices is often a confusing and frustrating process, especially for home users who do not have the required networking knowledge and skills to configure networks.

One source of confusion and error in configuring a communication device, such as a gateway, is determining which port on the device should be used for the WAN connection, and which are used for the LAN connection(s). Some communication devices allow a user to manually configure any port to be the WAN port. However, such manual configuration usually involves a series of software and/or hardware selections that most home users find daunting. Thus, most communication devices that are marketed to home users have a single port that is dedicated to, and labeled as the WAN port. Other ports are typically labeled as LAN ports. Nevertheless, many home users do not understand the difference between a WAN and a LAN, or otherwise can not distinguish between the WAN and LAN ports. As a result, sometimes a LAN line is incorrectly connected to the WAN port and/or the WAN line is incorrectly connected to a LAN port. This simple error may go unnoticed, causing the user to waste time and become frustrated trying to determine why the home network does not work as expected. To eliminate these problems, it would be desirable for a communication port to automatically configure itself for the type of line connected to the port—either WAN or LAN.

In a manner similar to the auto-sensing techniques discussed above, plug-and-play technology enables a computer to automatically detect the presence of a peripheral device that has been newly connected to the computer and then to automatically configure the computer to communicate with the peripheral device. Upon detecting a new peripheral device, a predetermined enumeration process is carried out by the computer according to a standard communication protocol, such as USB. The enumeration process enables the computer to determine the capabilities of the peripheral device and load appropriate software for driving and interfacing with the peripheral device. However, as with auto-sensing, plug-and-play technology requires a predetermined enumeration process that is expected and understood by both the computer and the peripheral device. A universal plug-and-play (UPnP) standard has been proposed by an industry initiative called the Universal Plug-and-Play Forum. UPnP defines a communication standard whereby a device can dynamically join a network, obtain an internet protocol (IP) address, convey its capabilities, and learn about the presence and capabilities of other devices. All devices on the network must listen to a standard multicast address for discovery messages from a newly joined device, and respond if a match is determined with search criteria of the discovery message. However, this again requires a predefined discovery process that is expected and understood by both the newly added device and other devices on the network. A formal predefined discovery process could be applied to ports of a communication device, but it would be preferable if each port could distinguish between an internal (e.g., LAN) connection and an external (e.g., WAN) connection with less processing overhead than is required by a formal protocol that requires predetermined discovery processing on both ends of the connection.

Other attempts have been made to enable a port to handle multiple types of communications. For example, some existing switches can map any port as the WAN port. However, the mapping is predetermined. The mapping is not defined in response to auto-detecting a WAN connection made to a port. As another example, Mapletree Networks, Inc. provides a UNIPORTE® architecture wherein each port can process various types of communication, such as modem, fax, integrated services digital network (ISDN), voice over IP (VoIP), fax over IP (FoIP), and voice over digital subscriber line (VoDSL). According to Mapletree Networks, Inc. product literature, each port can be dynamically reconfigured by sensing the type of incoming call, identifying an available port, assigning the call to the available port, and loading a software module into a digital signal processor (DSP) to enable the port to process the type of call sensed. Although flexible, this architecture requires a DSP for each port, and substantial processing overhead is required for configuring each port. This architecture also requires a reduced instruction set computer (RISC) processor to perform protocol processing functions, such as voice/data packet framing, error correction, compression, and jitter buffer management. It would clearly be preferable to provide ports that can distinguish between a LAN connection and a WAN connection with fewer components and less processing than is needed in the prior art approach.

SUMMARY OF THE INVENTION

The present invention provides a method and system for automatically detecting connection of a WAN communication line to one of a plurality of substantially equivalent communication ports of an electronic communication device. The electronic communication device, or a host computer attached to the electronic communication device, detects an initiation event on the selected communication port. The initiation event may result from a user coupling a communication line to the selected communication port, power being applied to the device, or other such events. In response to the initiation event, the communication device or the host computer automatically attempts to access the WAN through the selected communication port. The attempt may take the form of an Internet connection request to one or more predefined uniform resource identifiers (URIs), or other form of initiating communication. The communication device or host computer then monitors the selected communication port for a valid response to determine whether the attempt was successful. If the attempt to access the WAN through the selected communication port was successful, the device or host computer sets the selected communication port as a WAN port. Alternatively, if the attempt was not successful, the device or host computer may check to see if the selected communication port is connected to a LAN line. If the selected communication port is connected to a LAN line, or as a default, the device or host computer sets the selected communication port as a LAN port. In any case, the device or host computer may further store a status of the selected communication port, indicating whether it is currently set as a WAN or LAN communication connection.

The device or host computer may also perform a number of other steps to prepare for automatically detecting connection of a WAN communication line to the selected communication port. For example, the device or host computer may determine whether a WAN communication connection was previously defined, and verify the previously defined WAN communication connection is currently valid. The device or host computer may provide a user with the opportunity to confirm that a WAN is currently available, confirm that the user desires automatic detection of the WAN communication connection, or enter other user configuration options. Another aspect of the invention is a memory medium having machine instructions for the communication device or the host computer to automatically detect connection of a WAN communication line to a selected communication port, as described in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
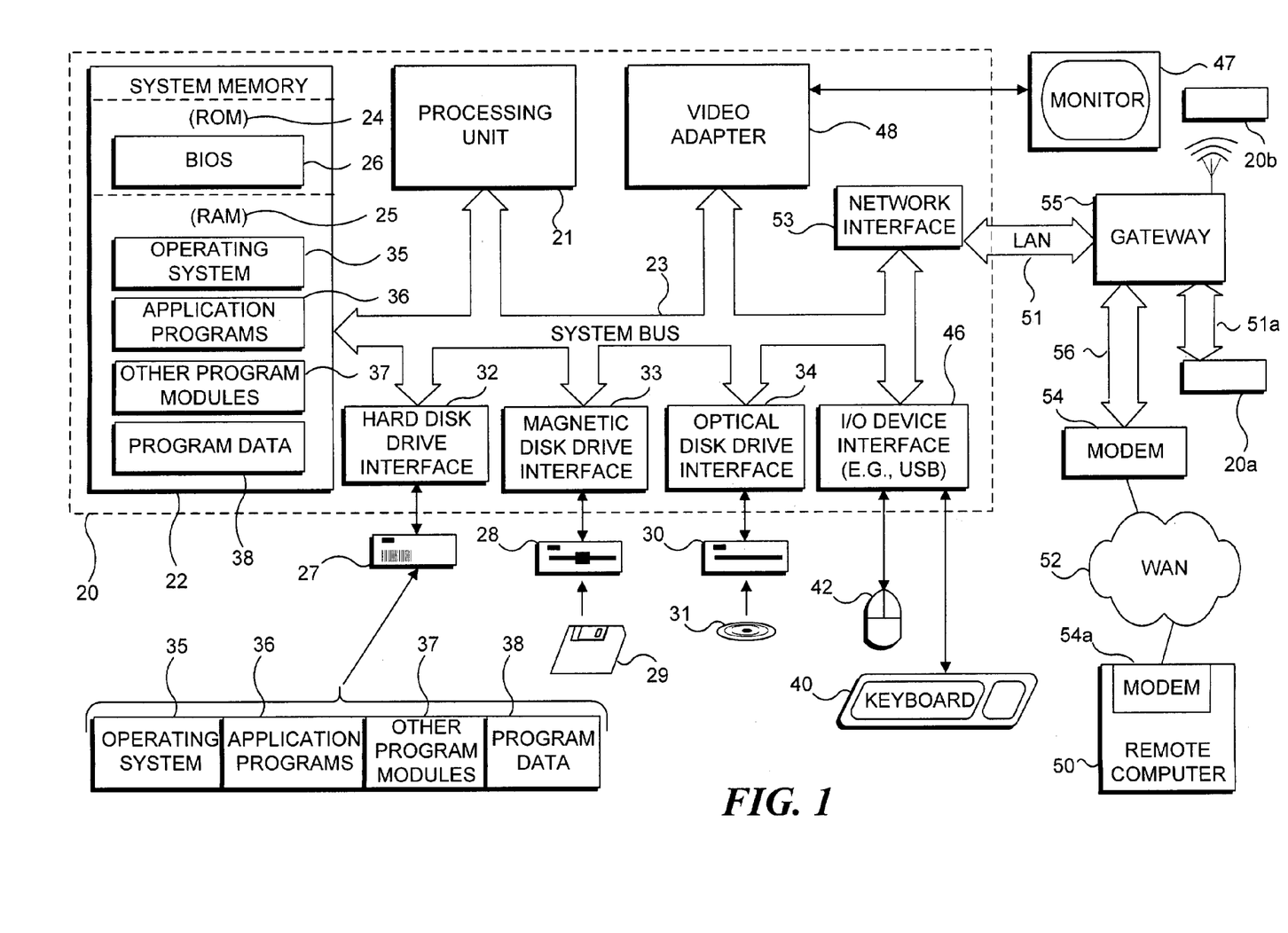
FIG. 1 is a schematic block diagram of an exemplary computing environment suitable for implementing the present invention.

FIG. 1 and the following discussion are intended to provide a brief, general description of a suitable computing environment implementing the present invention. Although not required, a portion of the present invention will be described in the general context of computer executable instructions, such as program modules that are executed by a multiport communication device and/or personal computer. Generally, program modules include routines, programs, objects, components, data structures, etc. that perform particular tasks or implement particular abstract data types. In addition to communication with a personal computer (PC), those skilled in the art will appreciate that this invention may be practiced with other computer system configurations, including game consoles, TV set-top boxes, multiprocessor systems, network personal computers, minicomputers, mainframe computers, industrial control equipment, automotive equipment, aerospace equipment, peripheral devices, hand held devices, pocket personal computing devices, digital cell phones adapted to connect to a network, and other microprocessor-based or programmable consumer electronic devices. The invention can also be practiced in distributed computing environments where tasks are performed by remote processing devices that are linked through a communications network. In a distributed computing environment, program modules may be located in both local and remote memory storage devices.

With reference to FIG. 1, an exemplary computing environment for implementing the present invention includes a general purpose computing device in the form of a conventional PC 20, sometimes referred to as a host computer. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read-only memory (ROM) 24 and random access memory (RAM) 25. A basic input/output (BIOS) system 26, containing the basic routines that help to transfer information between elements within the PC 20, such as during start up, is stored in ROM 24.

The PC 20 further includes a hard disk drive 27 for reading from and writing to a hard disk (not shown), a magnetic disk drive 28 for reading from or writing to a removable magnetic disk 29, and an optical disc drive 30 for reading from or writing to a removable optical disc 31, such as a compact disk-read only memory (CD-ROM) or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer-readable media provide nonvolatile storage of computer-readable machine instructions, data structures, program modules, and other data for PC 20. Although the exemplary environment described herein employs a hard disk, a removable magnetic disk 29, and a removable optical disc 31, it will be appreciated by those skilled in the art that other types of computer-readable media, which can store data that are accessible by a computer, such as magnetic cassettes, flash memory cards, digital video discs, Bernoulli cartridges, random access memories (RAMs), ROMs, and the like, may also be used in the exemplary operating environment. A number of program modules may be stored on the hard disk, magnetic disk 29, optical disc 31, ROM 24 or RAM 25, including an operating system 35 (optionally including one or more device drivers), one or more application programs 36 (such as a setup program), other program modules 37, and program data 38.

A user may enter commands and information into PC 20 through input devices such as a keyboard 40 and a pointing device 42. Other input devices (not shown) may include a microphone, joystick, game pad, satellite dish, scanner, digital camera, or the like. These and other input devices are often connected to processing unit 21 through an input/output (I/O) device interface 46 that is coupled to the system bus. Output devices, such as a printer (not shown), may also be connected to processing unit 21 through I/O device interface 46 that is coupled to the system bus. The term I/O device interface is intended to encompass each interface specifically used for a serial port, a parallel port, a game port, a keyboard port, a PS/2 port, a USB port and/or other I/O ports. Similarly, a monitor 47 or other type of display device is also connected to system bus 23 via an appropriate interface, such as a video adapter 48, and is usable to display a graphical user interface, application program interfaces, Web pages, and/or other information. In addition to the monitor, PCs are often coupled to other peripheral output devices (not shown), such as speakers (through a sound card or other audio interface—not shown).

PC 20 preferably operates in a networked environment using logical connections to one or more remote sources, such as a local area network (LAN) computer 20a, a wireless network computer 20b, and a remote computer 50. LAN computer 20a, wireless network computer 20b, and remote computer 50 may each be another PC, a server (which is typically generally configured much like PC 20), a peer device, a game console, a personal data assistant, a satellite, or other common network node, and typically includes many or all of the elements described above in connection with PC 20. In a networked environment, program modules depicted relative to PC 20, or portions thereof, may be stored in LAN computer 20a, wireless network computer 20b, and/or remote computer 50. The logical connections depicted in FIG. 1 include LAN segments 51 and 51a, which preferably use a well known LAN protocol such as transmission control protocol/internet protocol (TCP/IP) over Ethernet. The logical connections further include a wide area network (WAN) 52, such as the Internet, which preferably uses a well known WAN protocol such as TCP/IP. Such networking environments are common in offices, enterprise-wide computer networks, intranets, and the Internet.

When used in a LAN networking environment, PC 20 is connected to LAN segment 51 through a network interface or adapter 53. When used in a WAN networking environment, PC 20 typically uses a modem 54 or other means for establishing communications over WAN 52. Modem 54 may be internal or external to PC 20, but for exemplary purposes, will be discussed below primarily as a broadband modem, such as an xDSL modem, cable modem, or other high speed modem. PC 20 is often externally coupled to modem 54 via LAN segment 51, a gateway 55, and a WAN segment 56. WAN segment 56 will normally comprise a standard LAN segment, but is preferably the only LAN segment that accesses WAN 52. Gateway 55 includes multiple ports and may alternatively, or additionally, include means to act as a router, a wireless access point, a switch, a hub, a firewall, a bridge, and/or other type of communication unit. Gateway 55 is discussed in further detail below with regard to FIG. 2. It will be appreciated that the network connections shown are exemplary and other means of establishing a communications link between the computers may be used, such as wireless communication and wide band network links.

Exemplary Implementation of the Present Invention

The following describes exemplary implementations of embodiments using gateway 55 for communication between PC 20, acting as a host device, and other computers, such as LAN computer 20a and remote computer 50. The present invention is particularly useful in connection with wired communications. However, those skilled in the art will recognize that the details provided below may be modified slightly to apply to other forms of communication, such as wireless radio, IrDA infrared, satellite, optical, and other types of communication. Accordingly, it will be understood that the present invention is applicable to almost any type of communication device that communicates with other devices using almost any type of communication protocol. It will also be understood that the invention may be embodied in a communication device, in a host computer coupled to a communication device, or in other configurations. However, a gateway designed to communicate with other computing devices through one WAN port and at least one LAN port is used consistently in the following examples to simplify the discussion and disclosure of this invention.

Figure 2:
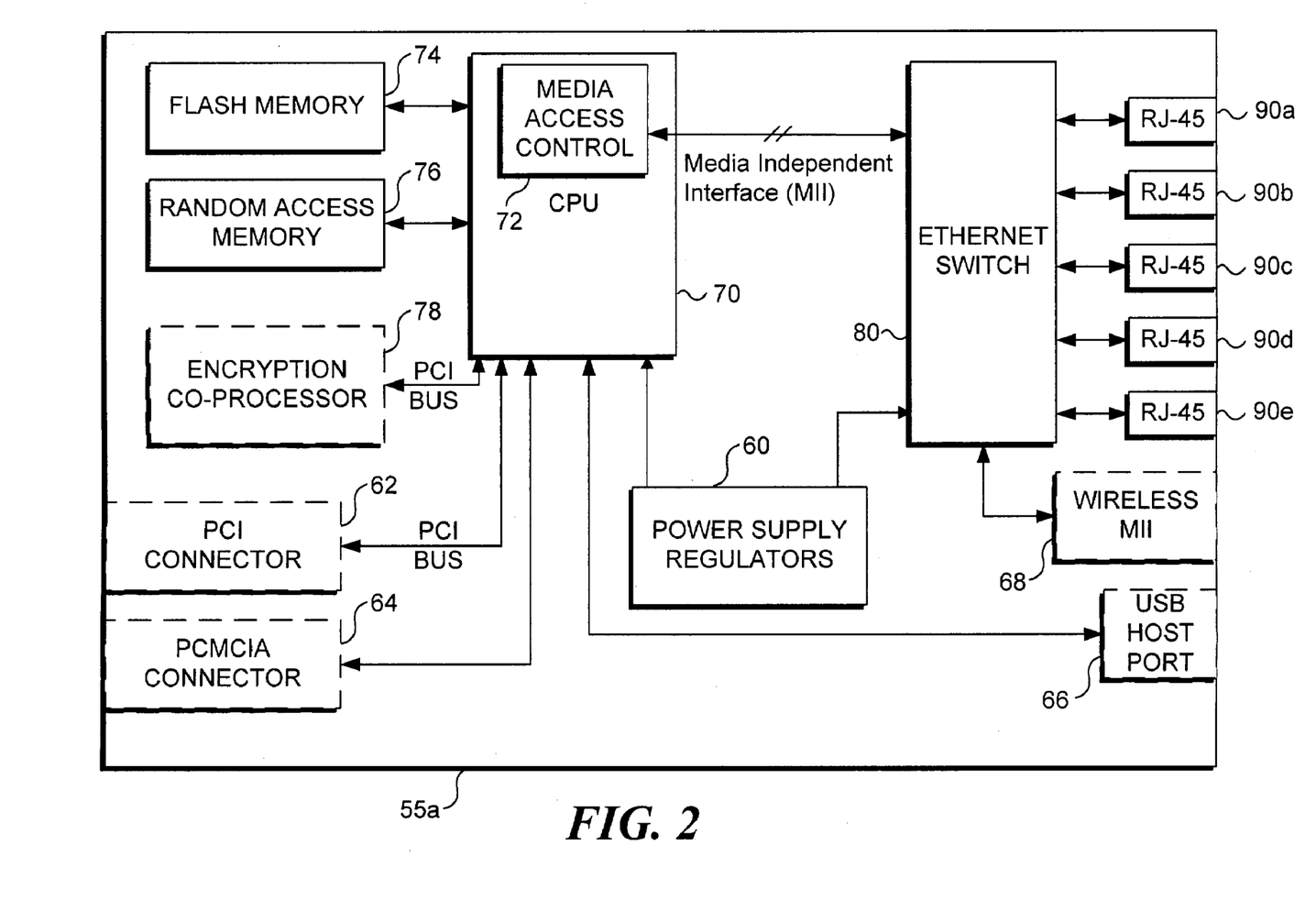
FIG. 2 is a block diagram of an exemplary gateway that can automatically detect whether a connection to a port is for a LAN or a WAN.

FIG. 2 is a block diagram of an exemplary gateway 55a. Gateway 55a includes power supply regulators 60, which provide appropriate power levels to other components, such as a CPU 70 and an Ethernet switch 80. CPU 70 is preferably a processor suitable for home networking devices. For example, CPU 70 may be a BCM 4702 network processor produced by Broadcom Corporation. CPU 70 also preferably includes one or more media access controls 72 for fast Ethernet communication and a standard memory communication system for communicating with volatile and nonvolatile memories. For instance, CPU 70 communicates with a flash memory 74, which preferably stores machine instructions for detecting a WAN connection and for carrying out other functions of gateway 55a. CPU 70 also communicates with a RAM 76 for temporary storage of instructions and data. CPU 70 may further optionally communicate with an encryption co-processor 78 for encrypting and de-encrypting communications. Other external communication means may be coupled to CPU 70, such as a PCI connector 62, a PC Memory Card International Association (PCMCIA) connector 64, and a USB host port 66. Additional external interfaces of gateway 55a may include a wireless media independent interface (MII) 68, debug ports (not shown), joint test action group (JTAG) scan interface (not shown), and other well known communication interfaces.

CPU 70 is further in communication with Ethernet switch 80 via an MII. Ethernet switch 80 preferably comprises a 10/100 multi-port switch, such as an 88E6052 Ethernet switch produced by Marvell Technology Group Limited. Ethernet switch 80 provides multiple physical layer (PHY) ports, wherein each port is connected to a standard registered jack (RJ), such as RJ-45 connectors 90*a*-90*e*. Each RJ-45 connector may be selectively connected to a LAN communication line, such as LAN segments 51 and 51*a* of FIG. 1, leading to another local computing device. Preferably, however, one RJ-45 connector of FIG. 2 is selectively connected to a communication line, such as WAN segment 56 of FIG. 1, leading to a WAN. Although WAN segment 56 will normally comprise another LAN communication line, for ease of discussion, this selected LAN communication line leading to a WAN, will simply be referred to as a WAN communication line. The corresponding connector and port will be referred to as a WAN connector and a WAN port.

Figure 3:
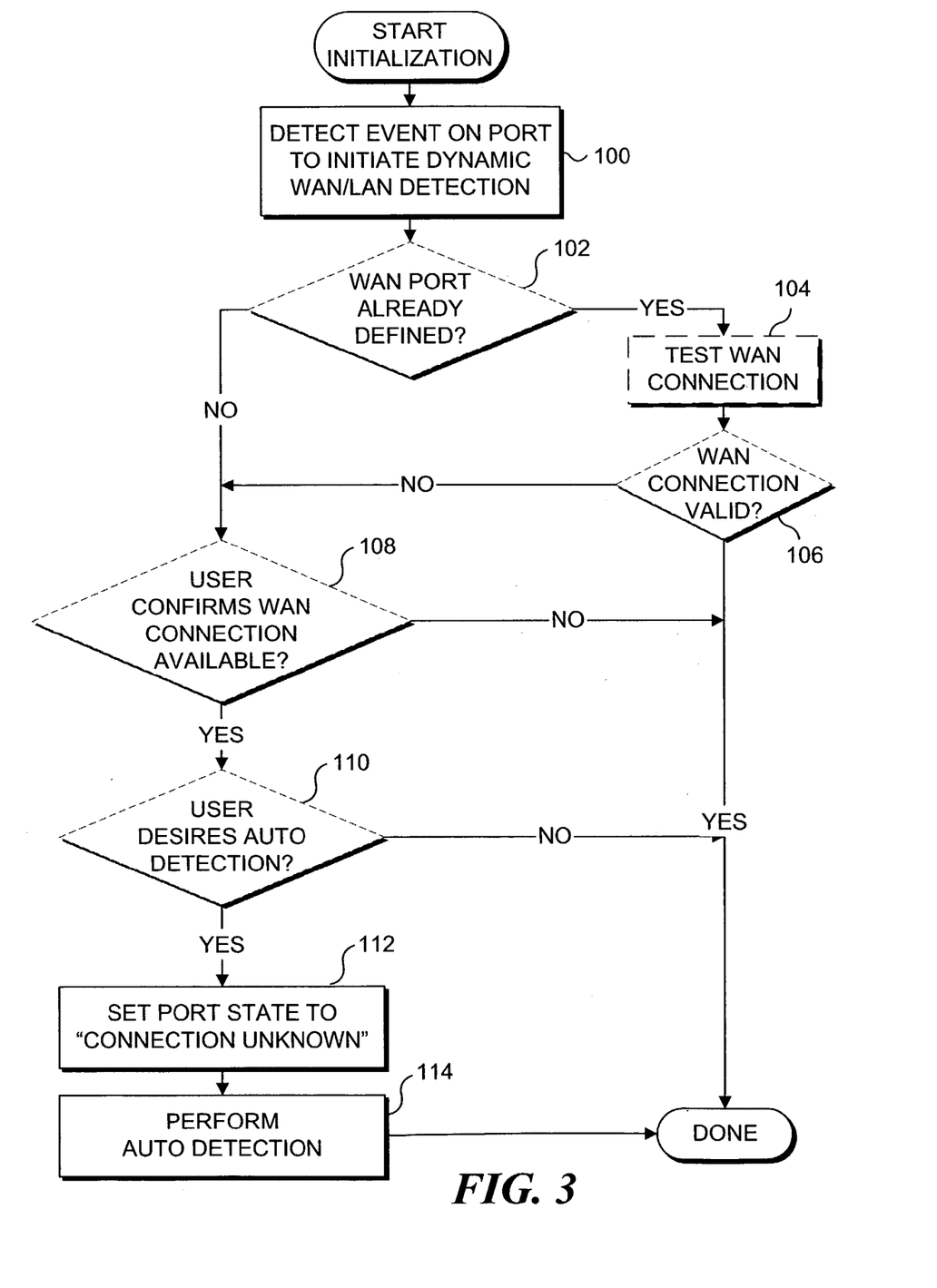
FIG. 3 is a flow diagram illustrating logic for initializing a process of auto-detecting that a communication line coupled to one of a plurality of ports on the gateway is for a WAN.

FIG. 3 is a flow diagram illustrating logic for initializing a process of detecting a WAN communication line coupled to one of the RJ-45 connectors of the gateway. At a step 100 an event occurs to initiate the detection process. The event may correspond to a user action, such as executing a software function on the PC to configure the gateway. Alternatively, the event may be automatically initiated. For example, a link detect event may occur when a communication line is initially coupled to any of the RJ-45 connectors. The event may occur by detecting a signal from a connected line, at the time power is applied to the gateway, or other well known event.

Once the process is initiated, the gateway may optionally determine, at a decision step 102, whether a WAN port is already defined. For example, a WAN connection may have been previously identified at one of the RJ-45 connectors and the mapping stored in the flash memory. The previous mapping may be to the RJ-45 connector that has just been connected to a line or a different RJ-45 connector. In any case, the previous mapping may enable the gateway to automatically configure itself upon power up. If a WAN port is already defined, the gateway may optionally test the previously defined WAN port, at a step 104, to see if the WAN communication line is still connected to the previously defined WAN port. At a decision step 106, the gateway may then optionally determine whether the WAN connection is valid. For example, a ping to the address corresponding to a predefined URI may be performed to ensure that the WAN communication line is connected and functional. If the WAN connection is valid on the previously defined WAN port, then no further processing is necessary.

However, if the WAN connection is not valid, or if a WAN port was not previously defined, the gateway may determine, at an optional decision step 108, whether the user has confirmed that a WAN connection is available. For example, a user interface dialog box may be displayed to the user, requesting that the user confirm that a WAN connection is available and connected to the gateway. Alternatively, the user may indicate that a WAN connection is not available, so that the gateway may be configured to act only as a LAN device. If the user indicates that no WAN connection is available, the gateway need not determine which port should be assigned as the WAN port. However, if the user confirms that a WAN connection is available, the gateway may optionally determine, at a decision step 110, whether the user wishes the gateway to automatically detect a WAN connection made to the RJ-45 connectors. For example, the gateway or PC software that is interfacing with the gateway may provide the user with an option to manually configure the gateway, rather than have the gateway automatically detect a WAN connection.

If the user wishes the gateway to automatically detect a WAN connection, the gateway first sets the state of the currently selected port to which a connection has been made to "connection unknown," at a step 112. At this point, the initialization process is complete and the gateway continues on to perform an auto-detection process on the current port, at a step 114, as described below with regard to FIG. 4.

Figure 4:
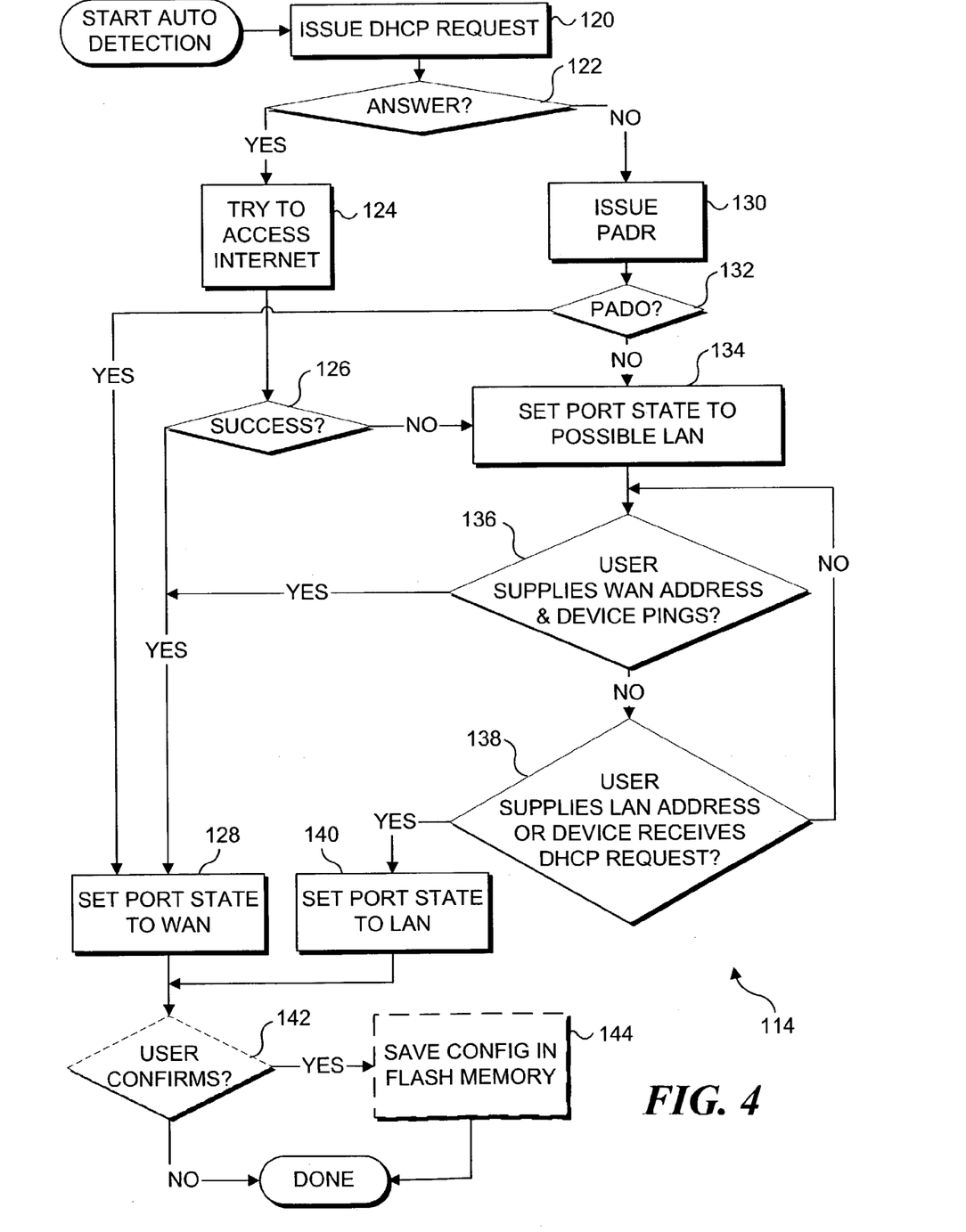
FIG. 4 is a flow diagram illustrating logic for automatically detecting whether a selected gateway port is connected to the WAN communication line or to a LAN communication line.

FIG. 4 is a flow diagram illustrating logic for automatically detecting whether a selected gateway port is connected to a WAN communication line or to a LAN communication line. At a step 120, the gateway issues a dynamic host configuration protocol (DHCP) request through the currently selected port. At a decision step 122, the gateway determines whether an appropriate DHCP response was received through the current port. However, a DHCP response could come from a LAN computer. Thus, a DHCP response by itself may not be conclusive evidence of a WAN connection to a port. If a valid DHCP response is received, the gateway further attempts to access the Internet, at a step 124. For example, the gateway may attempt to access a predetermined URI or a combination of URIs, which if successful, would indicate that the gateway has access the port to external communications, e.g., access to the Internet. The gateway determines, at a decision step 126, whether external communication was successful, and if so, the gateway sets the current port state to a WAN connection, at a step 128.

Other scenarios may also lead to setting the current port state to a WAN connection. For example, if the gateway does not receive an appropriate DHCP response, the gateway may issue a point-to-point protocol over Ethernet (PPPOE) active discovery request (PADR), at a step 130. At a decision step 132, the gateway determines whether a PPPOE active discovery offer (PADO) was received. If a PADO was received, the gateway sets the current port state to a WAN connection, at step 128.

However, if a PADO was not received, or if the gateway could not successfully access the Internet, the gateway sets the current port state to a "Possible LAN" connection, at a step 134. At a decision step 136, the gateway may then make a request to a user or wait for the user to manually supply a WAN address. If the user supplies a WAN address, such as a static IP address, the gateway also attempts to ping the supplied WAN address. If the ping is successful, the gateway sets the current port state to a WAN connection, at step 128. However, if the user does not supply a WAN address, or if the ping is unsuccessful, the gateway determines, at a decision step 138, whether the user has supplied a LAN address (instead of a WAN address). Alternatively, the gateway may determine whether it has received a DHCP request from another computer through the connection. If the user has supplied a LAN address or the gateway has received a DHCP request, the gateway sets the current port state to a LAN connection, at a step 140. Otherwise, control returns to decision step 136 and continues to loop while waiting for user input or a DHCP request.

Once the current port state has been set, the gateway may optionally determine, at a decision step 142, whether the user has confirmed the current port state. If the user confirms the current port state, the gateway may optionally save the configuration of the current port in flash memory, at a step 144. The gateway may alternatively save the configuration of the current port without any confirmation from the user.

Processing is then complete for the current port. The gateway may then process other ports, or perform other functions, as desired.

Although the present invention has been described in connection with the preferred form of practicing it and modifications thereto, those of ordinary skill in the art will understand that many other modifications can be made to the present invention within the scope of the claims that follow. For example, as indicated above, the automatic detection process described above may be performed by a computing device connected to the gateway, instead of being performed by the gateway itself. In that case, the computing device monitors the ports of the gateway and passes requests and responses through the gateway. Also, rather than reacting to an event on a selected port, the gateway may scan all ports upon power up or reset to determine which port is connected to the WAN. Accordingly, it is not intended that the scope of the invention in any way be limited by the above description, but instead be determined entirely by reference to the claims that follow.

The invention in which an exclusive right is claimed is defined by the following:

1. A method for automatically detecting a wide area network (WAN) communication connection to a communication port of an electronic device that includes a plurality of substantially equivalent communication ports, comprising the steps of:
   (a) detecting an initiation event on a selected communication port of the plurality of substantially equivalent communication ports, where the selected communication port is arbitrarily chosen by a user;
   (b) automatically attempting to access a WAN through the selected communication port, in response to the initiation event;
   (c) determining whether the attempt to access the WAN through the selected communication port was successful; and
   (d) setting the selected communication port as the WAN communication connection if the attempt was successful, wherein the WAN setting of the selected communication port is saved in a nonvolatile memory for future reference.

2. The method of claim 1, further comprising the step of automatically setting the selected communication port as a local area network (LAN) communication connection if the attempt was not successful.

3. The method of claim 1, wherein the step of detecting an initiation event comprises one of the steps of:
   (a) detecting a coupling of a communication line to the selected communication port;
   (b) detecting an application of a signal to the selected communication port;
   (c) detecting an application of power to the electronic device; and
   (d) detecting a user action to initiate configuration of the selected communication port.

4. The method of claim 1, wherein the step of automatically attempting to access the WAN comprises at least one of the steps of:
   (a) issuing a connection request through the selected communication port to a predetermined uniform resource identifier on the WAN;
   (b) issuing a dynamic host configuration protocol request through the selected communication port;
   (c) issuing a point-to-point protocol over Ethernet active discovery request through the selected communication port; and
   (d) issuing a ping command through the selected communication port to an address provided by a user.

5. The method of claim 4, wherein the step of determining whether the attempt to access the WAN on the selected communication port was successful, comprises one of the steps of:
   (a) receiving a connection verification through the selected communication port from the predetermined uniform resource identifier;
   (b) receiving a valid dynamic host configuration protocol response through the selected communication port in response to the dynamic host configuration protocol request;
   (c) receiving a point-to-point protocol over Ethernet active discovery offer through the selected communication port in response to the point-to-point protocol over Ethernet active discovery request; and
   (d) receiving a ping verification through the selected communication port from the address provided by the user.

6. The method of claim 1, wherein the steps are performed by one of:
   (a) the electronic device; and
   (b) a computing device coupled to the electronic device.

7. The method of claim 1, wherein prior to the step of attempting to access the WAN through the selected communication port, further comprising the steps of:
   (a) determining whether a WAN communication connection was previously defined; and
   (b) if a WAN communication connection was previously defined, determining if the previously defined WAN communication connection is currently valid.

8. The method of claim 1, wherein prior to the step of attempting to access the WAN through the selected communication port, further comprising at least one of the step of:
   (a) obtaining a confirmation that a WAN is available; and
   (b) obtaining a confirmation that a user desires automatic detection of the WAN communication connection.

9. The method of claim 1, wherein the electronic device conveys data with at least one of:
   (a) an Ethernet protocol; and
   (b) a transmission control protocol/Internet protocol.

10. A memory medium having machine instructions comprising a boot code stored thereon for carrying out the steps of claim 1.

11. A system for automatically detecting a wide area network (WAN) communication connection in an electronic device, comprising:
   (a) a processor;
   (b) a plurality of substantially equivalent communication ports, each in communication with the processor;
   (c) a memory in communication with the processor and storing machine instructions, said machine instructions causing the processor to carry out a plurality of functions, including:
      (i) detecting an initiation event on a selected communication port of the plurality of substantially equivalent communication ports, where the selected communication port is arbitrarily chosen by a user;
      (ii) attempting to access a WAN through the selected communication port, in response to the initiation event;
      (iii) determining whether the attempt to access the WAN through the selected communication port was successful; and
      (iv) setting the selected communication port as the WAN communication connection if the attempt was successful, wherein the WAN setting of the selected communication port is saved in a nonvolatile memory for future reference.

12. The system of claim 11, wherein the machine instructions further cause the processor to carry out the function of setting the selected communication port as a LAN communication connection if the attempt was not successful.

13. The system of claim 11, wherein the machine instructions further cause the processor to carry out one of the functions of:
   (a) detecting a coupling of a communication line to the selected communication port;
   (b) detecting an application of a signal to the selected communication port;
   (c) detecting an application of power to the electronic device; and
   (d) detecting a user action to activate the selected communication port.

14. The system of claim 11, wherein the machine instructions further cause the processor to carry out at least one of the functions of:
   (a) issuing a connection request through the selected communication port to a predetermined uniform resource identifier on the WAN;
   (b) issuing a dynamic host configuration protocol request through the selected communication port;
   (c) issuing a point-to-point protocol over Ethernet active discovery request through the selected communication port; and
   (d) issuing a ping command through the selected communication port to an address provided by a user.

15. The system of claim 14, wherein the machine instructions further cause the processor to carry out one of the functions of:
   (a) receiving a connection verification through the selected communication port from the predetermined uniform resource identifier;
   (b) receiving a valid dynamic host configuration protocol response through the selected communication port in response to the dynamic host configuration protocol request;
   (c) receiving a point-to-point protocol over Ethernet active discovery offer through the selected communication port in response to the point-to-point protocol over Ethernet active discovery request; and
   (d) receiving a ping verification through the selected communication port from the address provided by the user.

16. The system of claim 11, further comprising an Ethernet switch in communication with the processor and the plurality of substantially equivalent communication ports, wherein the Ethernet switch controls communication between each of the plurality of substantially equivalent communication ports and the processor, and controls communication among the plurality of substantially equivalent communication ports.

17. The system of claim 11, further comprising:
   (a) a display for providing a user interface to a user; and
   (b) an input device enabling a user to provide information to the system.

18. The system of claim 11, wherein the system is compatible with at least one of:
   (a) an Ethernet protocol; and
   (b) a transmission control protocol/Internet protocol.

19. The system of claim 11, wherein the system comprises one of a computer, a gateway, a router, a switch, a bridge, a hub, and a firewall.

* * * * *